(No Model.) 3 Sheets—Sheet 2.
W. M. WEBBER & C. O. CAMPBELL.
MOWING MACHINE.
No. 257,113. Patented Apr. 25, 1882.
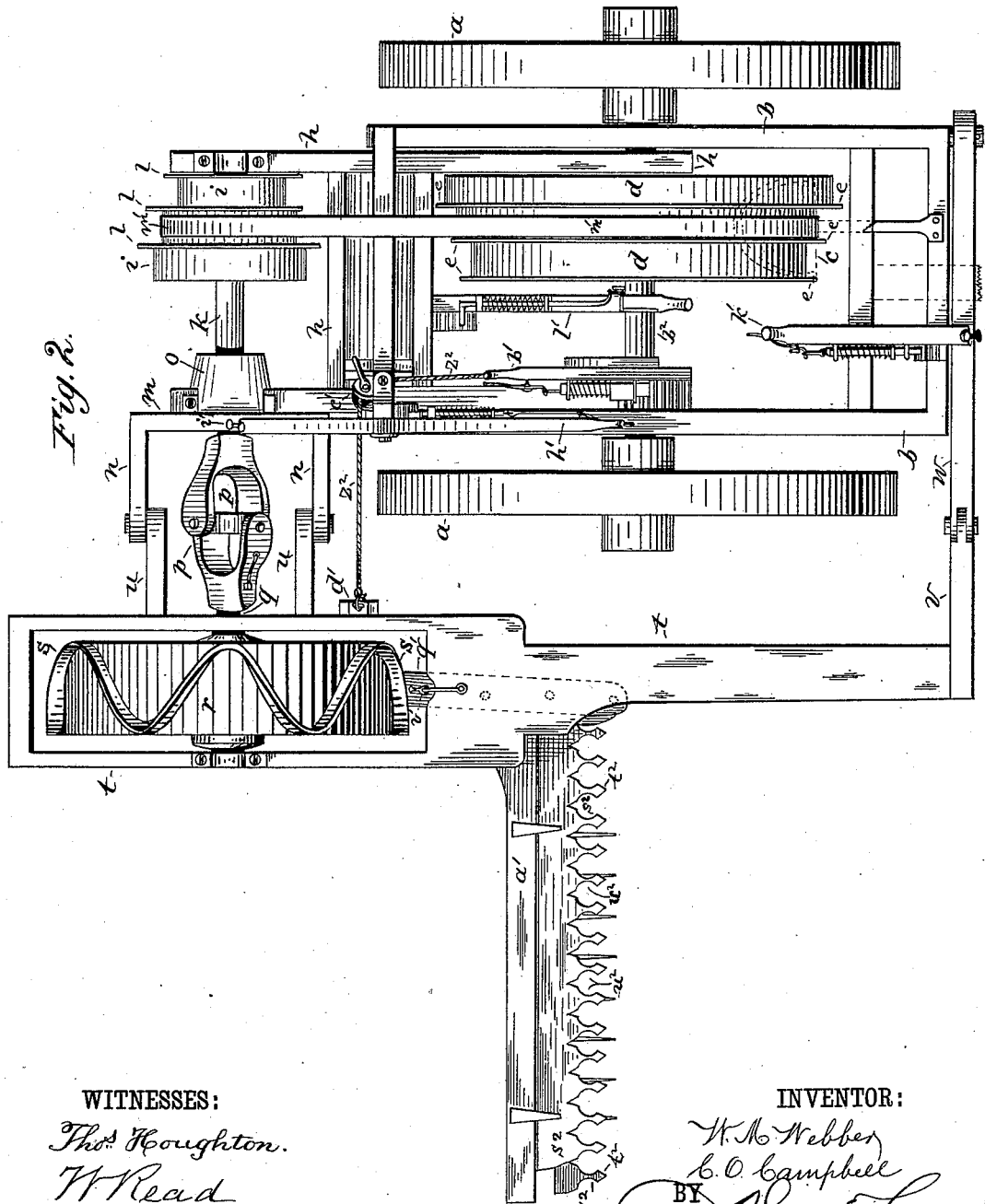
WITNESSES:
INVENTOR:

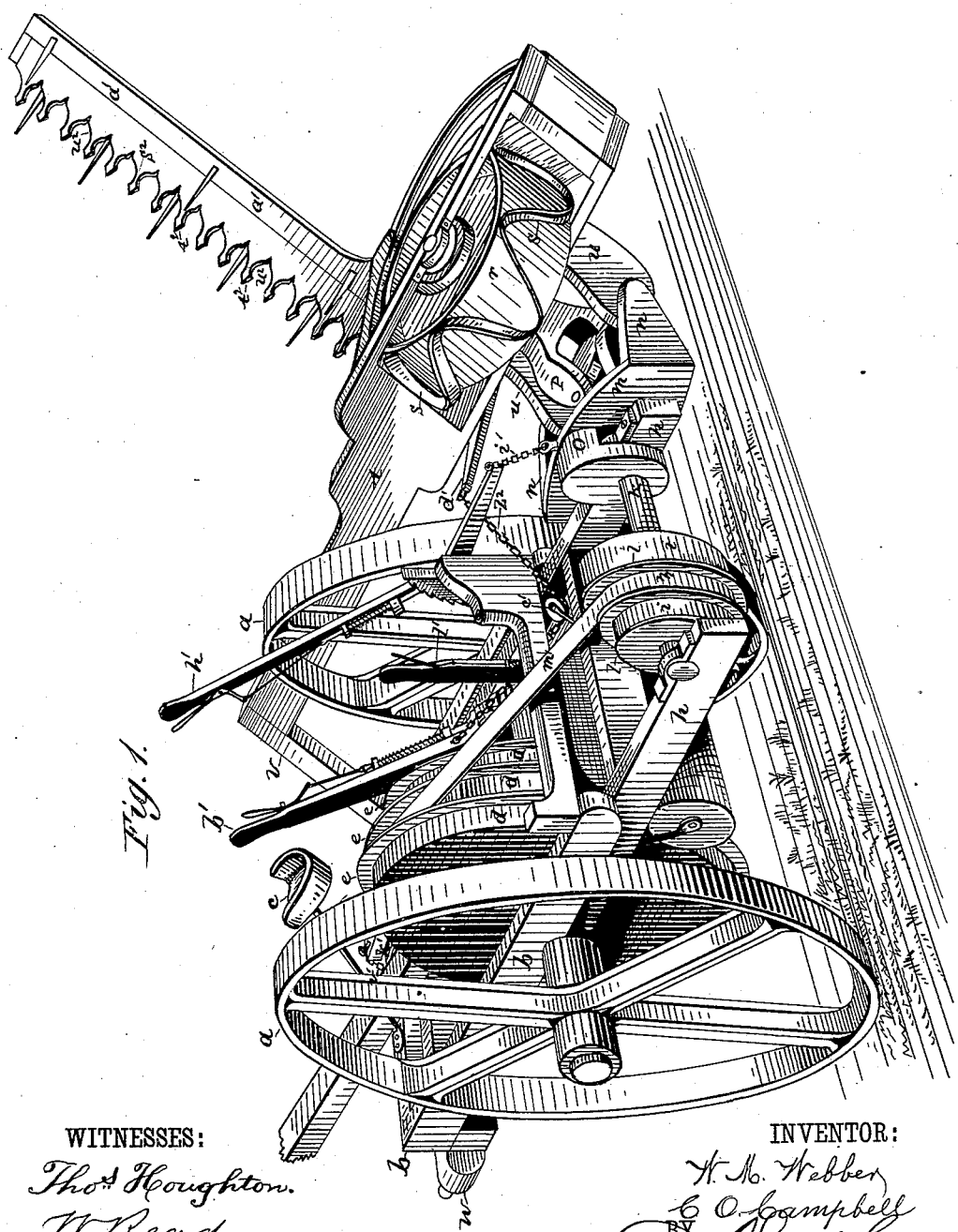

(No Model.) 3 Sheets—Sheet 3.
W. M. WEBBER & C. O. CAMPBELL.
MOWING MACHINE.
No. 257,113. Patented Apr. 25, 1882.
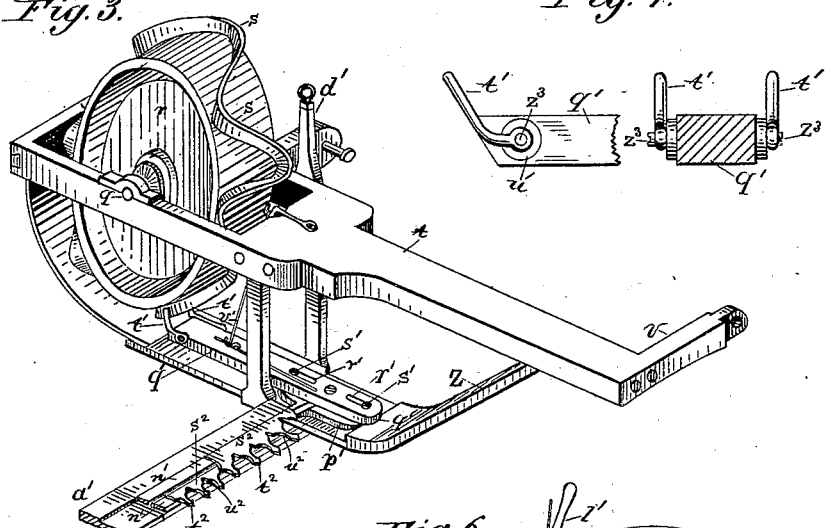
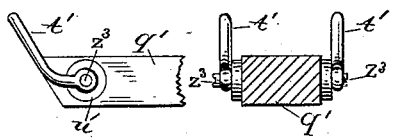
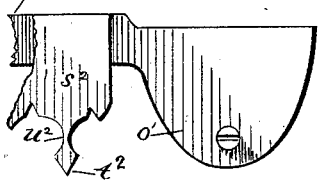
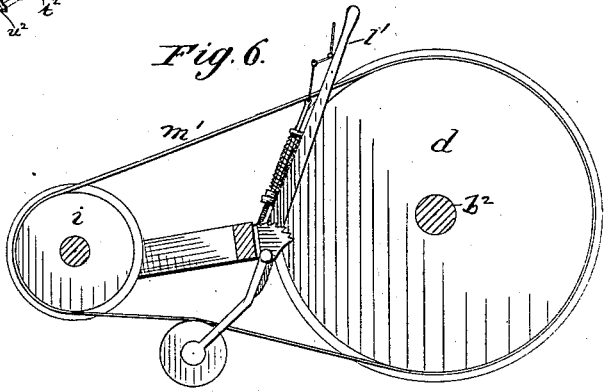
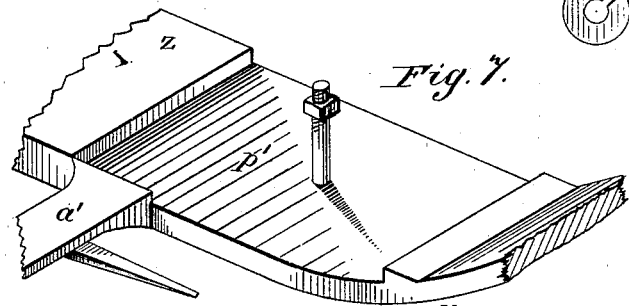
WITNESSES:
Thos. Houghton
W. Read
INVENTOR:
W. M. Webber
C. O. Campbell
BY
ATTORNEYS.

UNITED STATES PATENT OFFICE.

WILLIAM M. WEBBER, OF RAVENSWOOD, WEST VIRGINIA, AND CHARLES O. CAMPBELL, OF RICHMOND, VIRGINIA.

MOWING-MACHINE.

SPECIFICATION forming part of Letters Patent No. 257,113, dated April 25, 1882.

Application filed December 1, 1881. (No model.)

*To all whom it may concern:*

Be it known that we, WILLIAM MARIMAN WEBBER, of Ravenswood, in the county of Jackson and State of West Virginia, and CHARLES O. CAMPBELL, of Richmond, in the county of Henrico and State of Virginia, have invented a new and useful Improvement in Mowing-Machines; and we do hereby declare that the following is a full, clear, and exact description of the same, reference being had to the accompanying drawings, forming part of this specification, in which—

Figure 1 is a perspective view of our improved mowing-machine. Fig. 2 is a plan view of the same; and Figs. 3, 4, 5, 6, 7, and 8 are detail views.

Our invention relates to improvements in mowing-machines; and it consists in the peculiar construction and arrangement of the parts, as hereinafter more fully set forth.

In the accompanying drawings, $a\ a$ represent the driving-wheels of our improved mower, mounted on the axle $b^2$ by a ratchet and pawl of the usual construction, so as to make the driving-wheels fast on the axle in the forward movement of the machine, and loose on the axle in its backward movement.

$b$ represents a rectangular frame centrally pivoted on the axle.

$c$ represents a driver's seat, secured to the front end of the frame $b$, to which also the tongue is attached.

$d$ represents a cone-pulley on the axle of the driving-wheels, and fast thereon, and provided with three annular flanges, $e$, projecting above the periphery of the cone-pulley, to prevent the belt from slipping off when the belt-tightener, hereinafter described, is not applied.

$h$ represents a rectangular frame, pivoted to the axle near its front end, and between the sides of the frame $b$. The frame $h$ projects farther to the rear than the frame $b$.

$k$ represents a shaft journaled in the sides of the frame $h$, near its rear end, and carrying a cone-pulley, $i$, fast thereon, of less diameter than the cone-pulley $d$ on the axle, and provided with similar flanges, $l$, to those described on the cone-pulley $d$, the cone-pulleys being arranged on their shafts in the usual manner to increase or diminish the speed.

$m$ represents a plate, provided at each end with a projecting arm, $n$, at right angles to the plate $m$. The left-hand face of the plate $m$ is provided with a hub, $o$, secured rigidly to the back face of the plate $m$. The hub $o$ is cut away to admit of the passage of one of the sides of the frame $h$, and is provided with a central orifice for the passage of the shaft $k$, which passes also through a hole in the plate $m$, and is secured at its outer end to the inner end of the universal joint $p$.

The outer end of the universal joint $p$ is secured to the shaft $q$ of the wheel $r$, the latter being provided with a serpentine flange, $s$, on its periphery. The shaft $q$ of the cam-wheel $r$ is journaled in the frame $t$.

$u\ u$ represent arms secured to the inner side of the frame $t$, the ends of which are pivoted to the ends of the arms $n$. The forward end of the frame $t$ is provided with an arm, $v$, the inner end of which is pivoted to an arm, $w$, pivoted at its opposite end to the left-hand side of the frame $b$.

To the under face of the frame $t$ is secured the shoe $z$, to which the finger-bar $a'$, of the usual construction, is rigidly attached. To the axle of the driving-wheels is pivoted loosely at its lower end the lever $b'$, the upper end of which is in reach of the driver. The lever $b'$ is provided with a spring-detent of the usual construction.

Near the lower end of the lever $b'$ is secured a chain or wire rope, $z^2$, which passes thence around a guide-pulley, $c'$, secured to the frame $h$, the chain being secured at its outer end to an arm, $d'$, projecting upwardly from the frame $t$. By this construction the driver in his seat can fold the finger-bar as desired in leaving or going to the field, or to avoid obstructions in the operation of the machine.

$h'$ represents a lever having its fulcrum on the rear end of the frame $b$, and on the right side thereof, and provided with a spring-detent of the usual construction. To the rear end of the lever $h'$ is secured a chain, $i'$, the opposite end of which is secured to an eyebolt driven into the plate $m$.

$k'$ represents a lever having its fulcrum in the forward end of the frame $b$, and provided with a spring-detent of the usual construction. To the lower end of the lever $k'$ is secured a chain, the opposite end of which is secured to the arm $w$.

$l'$ represents a belt-tightener of ordinary construction, pivoted to the lower frame, $h$, and provided with a spring-detent. $m'$ represents a belt passing around the cone-pulleys.

$n'$ $n'$ represent cutter-bars, each similarly constructed, and each provided with a heel, $o'$, adapted to reciprocate in a recess, $p'$, in the upper face of the shoe $z$.

$q'$ represents a lever, pivoted to the shoe between the heels $o'$ of the cutter-bars, and provided with slots $r'$, through which pass screws $s'$, or pins secured to the heels of the cutters. The rear end of the lever $q'$ is provided with two bent adjustable rods, $t'$, adapted to engage with the serpentine flange on the wheel. The bent rods $t'$ are each provided with a loop at its front end, through which passes a screw, $z^3$, a washer or packing, $u'$, being inserted between the bent rod and lever, whereby when the bent rods become worn by engagement with the wheel-flange the washer or packing $u'$ may be removed and the screws inserted farther into the lever. $v'$ (see Figs. 2 and 3) represents a supporting-rod, secured at its lower end to the upper face of the lever $q'$, and thence bent upwardly and pivoted at its opposite end to the frame $t$.

The function of the supporting-rod $v'$ is to hold the lever $q'$ slightly above the shoe, and thereby avoid frictional contact with the upper surface of the shoe. The cutters $s^2$, formed on the cutter-bars $n'$, are alike, and are constructed as follows: The cutters $s^2$, instead of being made of the usual triangular shape, are stamped or otherwise formed with triangular points $t^2$, terminating at their ends with curved or sickle-shaped edges $u^2$, intersecting each other at their bases. By this construction of cutters, adapted to reapers as well as mowers, the stalks of grain or grass are securely held by the sickle-shaped form of cutter.

A platform, reel, and rake may be secured to the machine above described, so as to convert it into a reaper.

By the employment of a universal joint at the inner end of the cam-wheel the floating finger-bar can be raised to any angle—to trim a hedge, for example—and the cutters operated as well as in any other position of the finger-bar.

What we claim as our invention is—

1. The combination, with the frames $b$ $h$, pivoted to the axle of the driving-wheels, of the frame $t$, carrying the shoe $z$, and finger-bar $a'$, rigidly secured thereto, the frame $t$ being pivoted at its front end to the arm $w$, hinged to the frame $b$, and pivoted at its rear end to the frame $h$, whereby the finger-bar is made a floating one, substantially as described.

2. The combination, with the frames $b$ $h$, pivoted to the axle of the driving-wheels, of the frame $t$, carrying the shoe $z$, and finger-bar $a'$, rigidly secured thereto, the frame $t$ being pivoted at its front end to the arm $w$, hinged to the frame $b$, and pivoted at its rear end to the frame $h$, lever $b'$, and chain $z^2$, secured to the lever and frame $t$, whereby the floating finger-beam may be raised and lowered as desired, substantially as described.

3. The combination, with the frame $b$, provided with the levers $k'$ $h'$ at its front and rear ends, respectively, the former connected by a chain with the arm $w$, pivoted to the frame $b$, and the latter connected by a chain with the frame $h$, of the shaft $k$, hub $o$, plate $m$, having arms $n$, universal joint $p$, and frame $t$, pivoted to the arm $w$ at its front end and hinged to the arms $n$ at its rear end, substantially as described.

4. The combination, with the cutter-bars $n'$ $n'$, each provided with a heel, $o'$, adapted to reciprocate in a recess, $p'$, in the upper face of the shoe $z$, of the lever $q'$, pivoted to the shoe and provided with the bent rods $t'$ at its inner end, and having slots $r'$ $r'$, screws $s'$, passing through the slots and secured to the heels of the cutter-bars, and wheel $r$, provided with the serpentine flange $s$ on its periphery, substantially as described.

5. The combination of the cutter-bars $n'$ $n'$, each provided with a heel, $o'$, shoe $z$, lever $q'$, provided with the bent rods $t'$ $t'$, and having slots $r'$ $r'$, screws $s'$, wheel $r$, having the serpentine flange $s$ on its periphery, and shaft $q$, arms $u$ $u$, secured to the frame $t$ and pivoted to the arms $n$, secured to the plate $m$, universal joint $p$, shaft $k$, and cone-pulleys $i$ $d$, provided with circular flanges fast on the driving-axle and shaft $k$, and connected by a belt, substantially as described.

6. The combination, with the oscillating lever $q'$, pivoted to the shoe and provided with the bent rods $t'$ at its rear end, and having slots $r'$ $r'$, screws $s'$, passing through the slots and secured to the heels of the cutter-bars, and wheel $r$, of the supporting-rod $v'$, secured at its lower end to the oscillating lever $q'$ and pivoted at its upper end to the frame $t$, substantially as described.

7. The combination, with the wheel $r$, provided with the serpentine flange $s$ on its periphery, and the oscillating lever $q'$, of the bent adjustable rods $t'$ $t'$, each provided with a loop at its front end, screws $z^3$, and washers $u'$, to adjust the rods for wear, substantially as described.

W. M. WEBBER.
C. O. CAMPBELL.

Witnesses:
SOLON C. KEMON,
W. READ.